(12) United States Patent
Hosaka et al.

(10) Patent No.: US 8,148,010 B2
(45) Date of Patent: Apr. 3, 2012

(54) BIPOLAR BATTERY AND BATTERY ASSEMBLY

(75) Inventors: Kenji Hosaka, Yokosuka (JP); Hideaki Horie, Yokosuka (JP); Hajime Satou, Yokohama (JP); Yoshio Shimoida, Yokohama (JP); Teruo Segawa, Ayase (JP); Gen Takayama, Yokosuka (JP); Ohtani Yoshihiko, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 293 days.

(21) Appl. No.: 11/946,177

(22) Filed: Nov. 28, 2007

(65) Prior Publication Data
US 2008/0131759 A1    Jun. 5, 2008

(30) Foreign Application Priority Data

Nov. 30, 2006   (JP) .................................. 2006-324806
Oct. 23, 2007    (JP) .................................. 2007-275588

(51) Int. Cl.
*H01M 6/48*    (2006.01)
*H01M 2/00*    (2006.01)

(52) U.S. Cl. ............. 429/210; 429/61; 429/62; 429/100
(58) Field of Classification Search .......... 429/122–347, 429/61, 62, 100; 29/623.1–623.5
See application file for complete search history.

(56) References Cited

U.S. PATENT DOCUMENTS

| | | | |
|---|---|---|---|
| 5,364,713 A | | 11/1994 | Von Benda et al. |
| 5,397,661 A | * | 3/1995 | Kaun ............................ 429/181 |
| 5,800,939 A | * | 9/1998 | Mishina et al. ................. 429/57 |
| 7,163,765 B2 | * | 1/2007 | Hosaka et al. ................ 429/185 |
| 7,279,248 B2 | * | 10/2007 | Fukuzawa et al. ............ 429/210 |
| 7,320,846 B2 | * | 1/2008 | Watanabe et al. ............. 429/210 |
| 7,609,029 B2 | * | 10/2009 | Shimamura et al. .......... 320/116 |
| 7,759,005 B2 | * | 7/2010 | Hosaka et al. ................ 429/210 |

(Continued)

FOREIGN PATENT DOCUMENTS

EP    0 700 109 A1    3/1996

(Continued)

OTHER PUBLICATIONS

Isamu Kurisawa and Masashi Iwata, "Internal Resistance and Deterioration of VRLA Battery-Analysis of Internal Resistance obtained by Direct Current Measurement and its application to VRLA Battery Monitoring Technique," Telecommunications Energy Conf.,1997. Intelec97,19th Int'l,Melbourne,Vic,Australia,Oct. 19-23, 1997, NY,NY,IEEE, Oct. 19, 1997, pp. 687-694 (ISBN:0-7803-3996-7).

*Primary Examiner* — Basia Ridley
*Assistant Examiner* — Jonathan G Leong
(74) *Attorney, Agent, or Firm* — Young Basile

(57) ABSTRACT

A bipolar battery and a battery assembly unit that reduces a current density change in a battery element is disclosed. The bipolar battery comprises a battery element configured by alternately stacking a bipolar electrode and an electrolyte layer, as well as cathode and anode terminal plates electrically connected to the battery element so as to extract the current from the battery element. In the bipolar battery, the total electrical resistance of the cathode and anode terminal plates along the surface direction is smaller than the total electrical resistance of the battery element along the stacking direction between the cathode and anode terminal plates.

20 Claims, 12 Drawing Sheets

U.S. PATENT DOCUMENTS

| | | | |
|---|---|---|---|
| 7,807,295 B2 * | 10/2010 | Takayama et al. | 429/210 |
| 2004/0161667 A1 * | 8/2004 | Fukuzawa et al. | 429/210 |
| 2007/0015047 A1 * | 1/2007 | Hosaka et al. | 429/66 |
| 2008/0131775 A1 * | 6/2008 | Takayama et al. | 429/210 |
| 2008/0220330 A1 * | 9/2008 | Hosaka et al. | 429/209 |
| 2009/0136844 A1 * | 5/2009 | Watanabe et al. | 429/210 |
| 2009/0233164 A1 * | 9/2009 | Shimamura et al. | 429/149 |

FOREIGN PATENT DOCUMENTS

| | | |
|---|---|---|
| JP | 60-241640 | 11/1985 |
| JP | 2001-236946 A | 8/2001 |
| JP | 2006-085921 A | 3/2006 |
| WO | 98/05081 | 2/1998 |

* cited by examiner $R2 = r2a + r2a + r2b$
$R3 = r3 + r3$

BIPOLAR BATTERY AND BATTERY ASSEMBLY

CROSS-REFERENCE TO RELATED APPLICATION

This application claims priority from Japanese Patent Application Serial No. 2006-324806, filed Nov. 30, 2006, and Japanese Patent Application Serial No. 2007-275588, filed Oct. 23, 2007, each of which is incorporated herein in its entirety by reference.

TECHNICAL FIELD

The present invention relates to a bipolar battery and a battery assembly formed by electrically connecting a plurality of bipolar batteries.

BACKGROUND

Recently, there has been an increased demand to reduce the amount of carbon dioxide in order to protect the environment. In the automobile industry, electric vehicles (EV) and hybrid electric vehicles (HEV) have been introduced to reduce the amount of carbon dioxide. A secondary battery for powering the motors of the electric and hybrid vehicles has been developed. Japanese Laid-Open Patent Publication No. 2001-236946 discloses a stacked-type bipolar battery for use as a secondary battery. However, such batteries are limited due to the current density change that occurs. That is, in such batteries, a current density change occurs depending on the correlation between an electrical resistance of the current, which flows along the surface direction in a region corresponding to the battery element in the cathode and anode terminals, and a total electrical resistance of the current that flows along the stacking direction between the cathode and anode terminals. This current density change promotes deterioration of the battery element and thereby facilitates the battery's degradation and reduces its durability.

BRIEF SUMMARY

Embodiments of the bipolar battery of the invention are disclosed herein. One such embodiment comprises a battery element including at least one electrolyte layer and at least one bipolar electrode alternately stacked, each bipolar electrode comprising a cathode formed at a first side of a collector and an anode formed at an opposite side of the collector. This embodiment also includes cathode and anode terminals electrically connected to each terminal end of the battery element and configured to extract a current flowing along a surface direction. An electrical resistance of the current flowing along the surface direction of a region of the battery element in the cathode and anode terminals is smaller than a total electrical resistance of the current flowing along a stacking direction between the cathode and anode terminals.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Embodiments of a bipolar battery and a battery assembly that provide a reduced current density change are disclosed herein. Hereinafter, certain embodiments are explained with reference to the drawings.

Figure 1A:
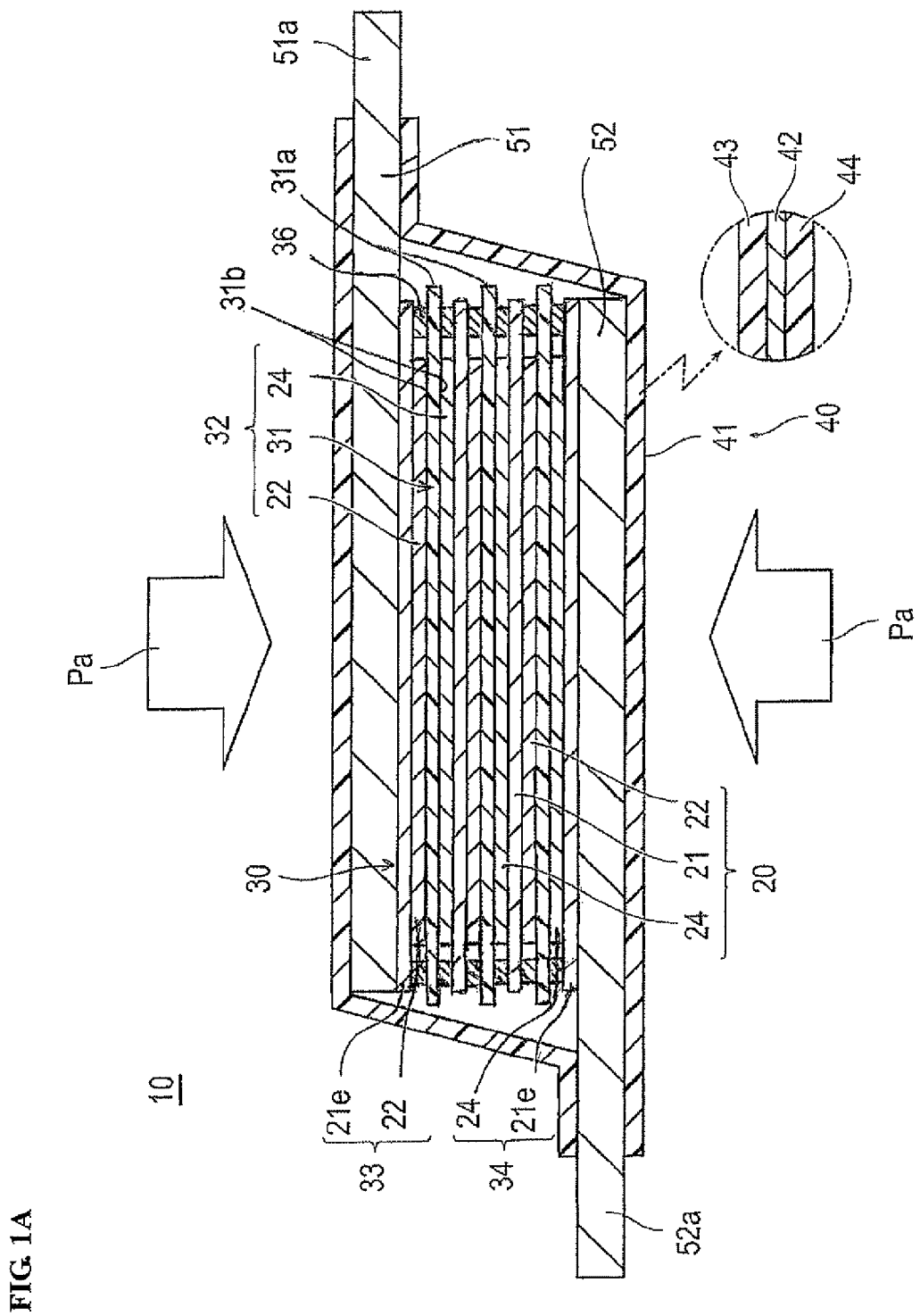
FIG. 1A is a cross-sectional view of a bipolar battery in accordance with a first embodiment of the invention.
Figure 2A:
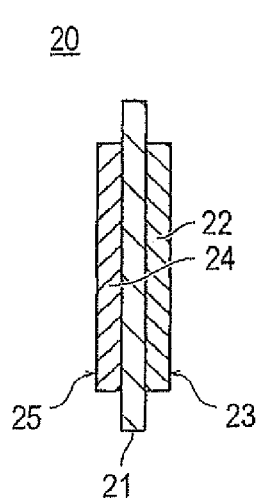
FIG. 2A is a cross-sectional view of a bipolar electrode.

A first embodiment of the bipolar battery is illustrated in FIG. 1A. The bipolar battery 10 is formed by alternately stacking the bipolar electrode 20 and an electrolyte layer 31 and housing in an exterior case 40 the battery element 30 formed of a series of the bipolar electrode 20 and the electrolyte layer 31. In the bipolar electrode 20, illustrated in FIG. 2A, a cathode 23 is formed by providing a cathode active material layer 22 on one side of a collector 21. An anode 25 is formed by providing an anode active material layer 24 on the opposite side of the collector 21. In the battery element 30 illustrated in FIGS. 1A and 2B, a unit cell layer 32 comprises the cathode active material layer 22, the electrolyte layer 31 and the anode active material layer 24. The unit cell layer 32 is interposed between adjacent collectors 21.

Figure 2B:
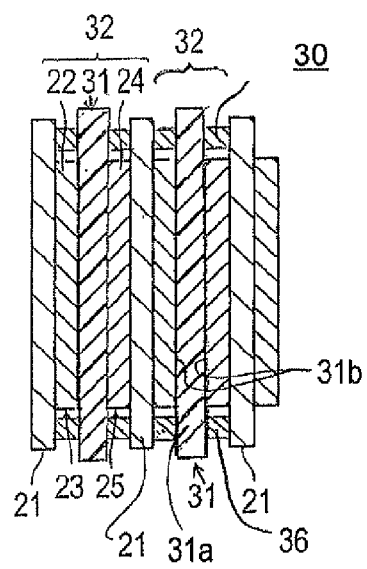
FIG. 2B is a cross-sectional view explaining a unit cell layer.

A cathode terminal electrode 33 of the battery element 30 is provided by the cathode active material layer 22 adjacent to one surface of a first end collector 21e and stacked on the uppermost bipolar electrode 20 as shown in FIG. 1A. An anode terminal electrode 34 of the battery element 30 is provided by the anode active material layer 24 adjacent to a one surface of a second end collector 21e and stacked under the lowermost bipolar electrode 20. As shown in FIG. 2B, the electrolyte layer 31 comprises a layer of polymer gel electrolyte penetrating a porous separator 31a segmenting the cathode 23 and the anode 25. The electrolyte layer 31 also comprises a layer 31b of the polymer gel electrolyte for conducting ions between the separator 31a and the cathode active material layer 22 or the anode active material layer 24.

The separator 31a, which is a part of the electrolyte layer 31, may be porous PE (polyethylene), the porosity creating permeability. However, the material of the separator is certainly not limited thereto since it may include other polyolefins such as PP (polypropylene), a three-layer structure of PP/PE/PP, polyamide, polyimide, aramide or non-woven fabric. The non-woven fabric includes, for example, cotton, rayon, acetate, nylon and/or polyester. Although the separator 31a is an insulator for segmenting the cathode and the anode, the ions and current flow because the electrolyte penetrates the porous inner portion of the separator 31a.

In each terminal end of the battery element 30 of FIG. 1A (in the stacking direction), cathode and anode terminals, or terminal plates, 51 and 52 are electrically connected for extracting the current, which flows along the surface direction. Specifically, the cathode terminal plate 51 is electrically connected to the end collector 21e of the cathode terminal electrode 33, and the anode terminal plate 52 is electrically connected to the end collector 21e of the anode terminal electrode 34. The cathode terminal 51 is larger than at least a projecting area of the cathode active material layer 22 of the cathode terminal electrode 33. The cathode terminal 51 is arranged by overlapping on the end collector 21e so as to cover a projecting surface of the cathode active material layer 22. Likewise, the anode terminal 52 is larger than at least a projecting area of the anode active material layer 24 of the anode terminal electrode 34 and is arranged by overlapping on the end collector 21e so as to cover a projecting surface of the anode active material layer 24. The terminals 51, 52 and the end collectors 21e are electrically and evenly bonded throughout the entire projecting surfaces of the active material layers 22, 24. The terminals 51, 52 evenly receive current from an entire surface of the region in which the current substantially flows, reducing the change in current density across the surface.

When current density changes in known bipolar batteries, the battery element deteriorates. When the density current change occurs in a predetermined region with respect to the surface direction, the amount of current flowing along the stacking direction becomes redundant, the caloric value in the region increases to the region expands in the stacking direction. In turn, the contact resistance of the region along the stacking direction is locally reduced. Because the resistance is further degraded, the current value becomes redundant, and the deterioration thereof is further facilitated.

In the bipolar battery 10 taught herein, the current density change occurs in the battery element 30 depending on the correlation between the total electrical resistance of the cathode and anode terminal plates along the surface direction and the total electrical resistance of the battery element along the stacking direction between the cathode and anode terminals 51 and 52. In this regard, the total electrical resistance of the cathode and anode terminal plates along the surface direction is less than the total electrical resistance of the battery element along the stacking direction between the cathode and anode terminal plates 51 and 52. By establishing and maintaining this correlation, the change in current density is diminished, and the battery element 30 has a reduced deterioration, resulting in longer battery life.

The ratio of the total electrical resistance of the cathode and anode terminal plates along the surface direction to the total electrical resistance of the battery element along the stacking direction, once established, is preferably equal to or less than 0.57. By maintaining this ratio, the change in current density in the battery element 30 is reduced. Establishing the ratio at equal to or less than 0.01 will reduce the change in current density to such an extent that it can be ignored. This virtually eliminates the deterioration of the battery element 30 that results from a change in current density.

Figure 3:
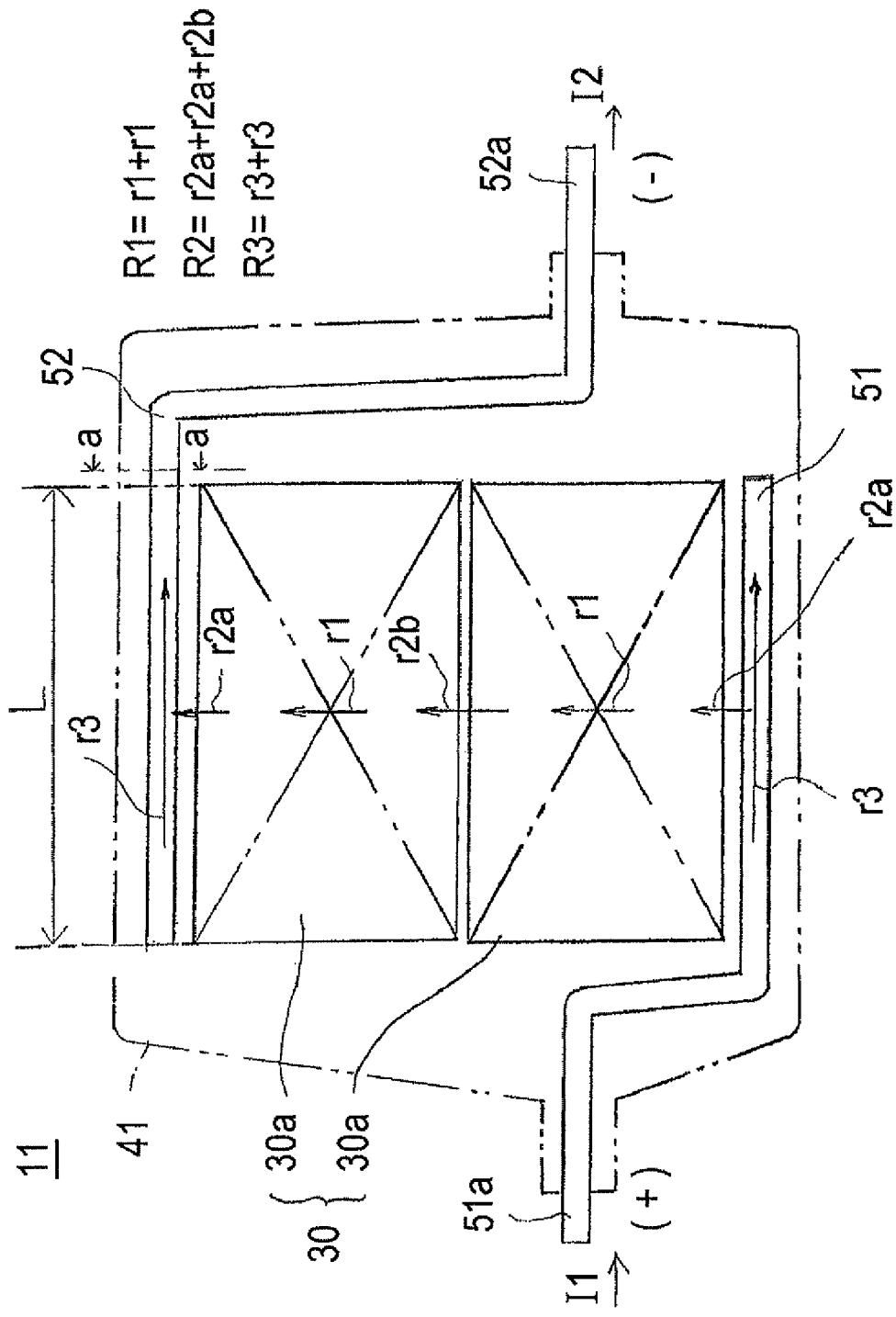
FIG. 3 is a conceptual view explaining the electrical resistance of the current in a bipolar battery.
Figure 4:
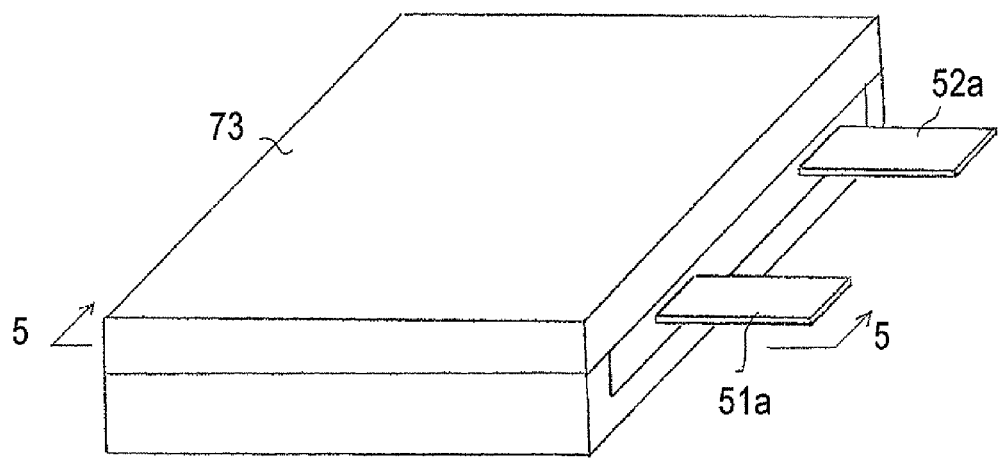
FIG. 4 is a perspective view of a bipolar battery in accordance with a second embodiment of the invention.

FIG. 3 is a conceptual view provided to explain the electrical resistance of the current in a bipolar battery 11. The battery element 30 of the bipolar battery 11 in FIG. 3 is formed by stacking a plurality of individual battery elements 30a along the stacking direction. FIG. 3 illustrates a two stack embodiment. In the individual battery elements 30a, the bipolar electrode 20 and the electrolyte layer 31 are alternately stacked. A high power battery can be easily provided by a certain number of individual battery elements 30a, which form a battery element unit. Further, it becomes easier to manufacture the battery by defining the individual battery element 30a.

As shown in FIG. 3, the electrical resistance of the battery element along the stacking direction includes the following: battery resistance R1 of the battery element 30; contact resistance r2a between each terminal end of the battery element 30 and each of the cathode and anode terminals 51 and 52; and contact resistance r2b between the individual battery elements 30a. The battery resistance R1 is a total of the battery resistance r1 in each individual element 30a. The contact resistance R2 is a total of each contact resistance r2a and r2b. Electrical resistance R3 along the surface direction of the cathode and anode terminals 51 and 52 is a total of the electrical resistance r3 in the regions in each of the terminals 51 and 52 corresponding to the battery element 30 (toward cathode and anode lead portions 51a and 52a). Specifically, the current flowing along the surface direction is a current flowing in regions of the cathode terminal 51 and the anode terminal 52 corresponding to the end collectors 21e in the cathode and anode sides of the battery element 30 shown in FIG. 1A.

In the bipolar battery 10 shown in FIG. 1A, the battery element 30 merely includes one individual element 30a, so the battery element 30 has the battery resistance R1 and the contact resistance r2a between each terminal end and each of the cathode and anode terminals 51 and 52. Since the contact resistance r2b does not exist, the contact resistance R2 is a total of the contact resistance r2a.

Measuring the battery resistance R1 of the battery element can be accomplished by allowing a certain current to flow in the bipolar battery and calculating a power drop from the power after five seconds and the power prior to discharging. The contact resistance is measured by the same method. The values from such measurement can be easily metered by metering the power at a predetermined position.

The electrical resistance R3 along the surface direction of the cathode and anode terminals 51 and 52 is determined by the type, thickness and length of material used. The length is a length of a region wherein the terminals 51 and 52 correspond to the electrode portion, i.e., a portion wherein the terminals 51 and 52 overlap with an electrode reacting portion. A unique volume resistance ratio "$\rho$" ($\Omega \cdot cm$) of a material of the cathode and anode terminals 51 and 52 is shown in FIG. 3. When a cross-sectional area of a surface orthogonal to a surface of the terminals 51 and 52 ("aa" cross-section) is A ($cm^2$) and a length of a surface corresponding to a battery element region in the terminals 51 and 52 (an electrode reacting surface) is L (cm), the resistance R3 ($\Omega$) is $r3=(\rho \times L)/A$.

Figure 1B:
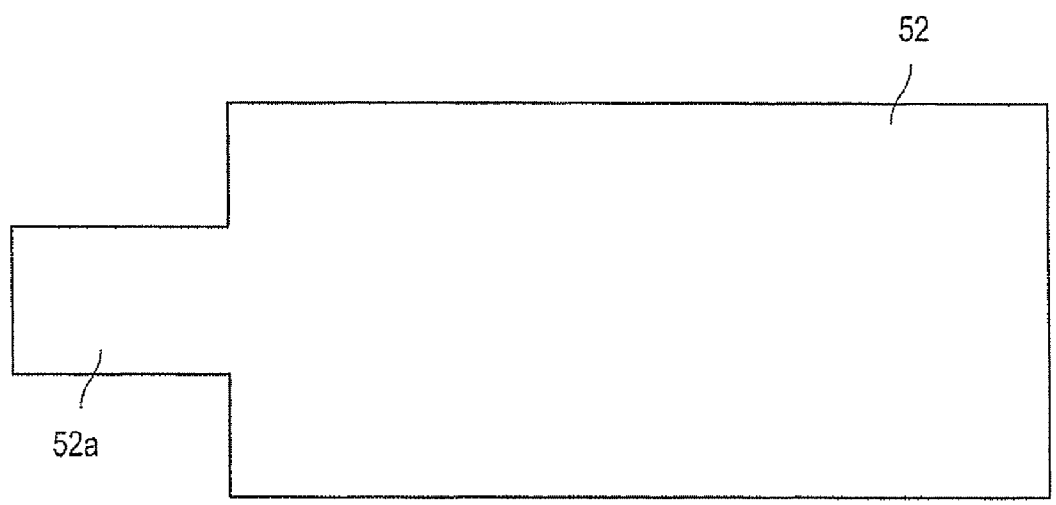
FIG. 1B is a planar view of an anode terminal electrically connected to a collector in a terminal electrode of a battery element.
Figure 1C:
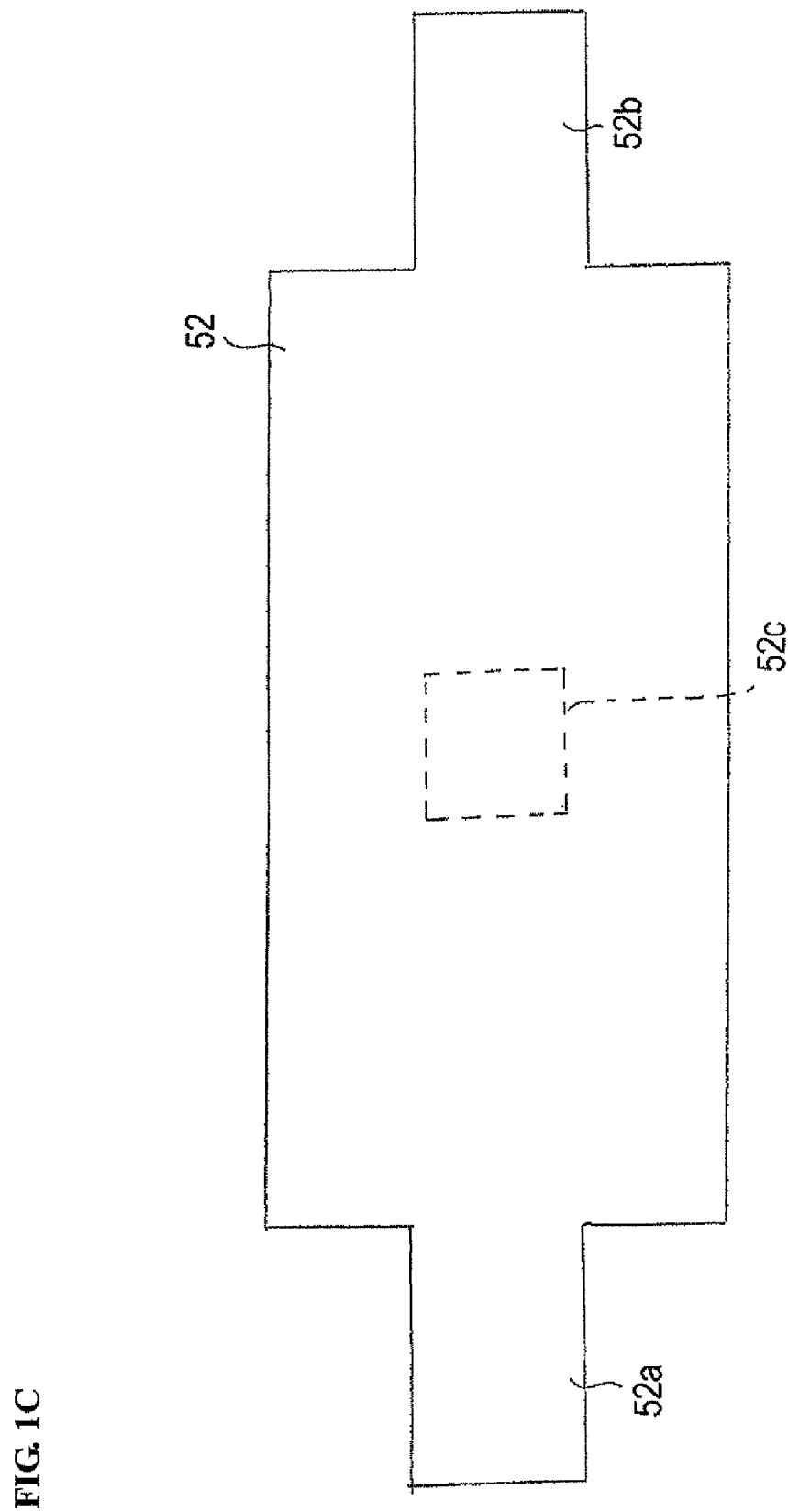
FIG. 1C is a modified example of an anode terminal shown in FIG. 1B.

FIG. 1B illustrates the terminal 52 of the anode and the anode lead portion 52a. Optionally, a lead portion 52b may be added to a surface opposite to the anode lead portion, as shown in FIG. 1C. Alternatively, a lead portion 52c indicated by a dot line in a center portion of the terminal 52 may be added so as to protrude from an inside of the exterior case 40. By doing so, the length L of a surface corresponding to the battery element region is substantially halved, and it is possible to establish a low resistance value. FIGS. 1B and 1C illustrate a shape of the anode terminal side, while the cathode terminal side has the same configuration.

The bipolar battery 10 can be formed from conventional materials used in a general lithium ion secondary battery. The terminals 51, 52, the exterior case 40, the collector 21, the cathode 23 (the cathode active material layer 22), the anode 25 (the anode active material layer 24) and the electrolyte layer 31 in the bipolar battery 10 are explained below.

The cathode terminal 51 and anode terminal 52, arranged by overlapping on the end collector 21e, together serve as a terminal for extracting the current. A material of the terminals 51 and 52 may include the material used in the lithium ion battery. For example, the material includes aluminum, copper, titanium, or other materials with high conductivity. Materials with low conductivity may also be used, since the resistance may be decreased by thickening a thickness direction, sufficiently securing a flow of the electricity along the surface direction. Therefore, stainless steel (SUS) having conductivity lower than aluminum may be used. Due to its corrosion resistant property, manufacturability and economical efficiency, aluminum is desirable. As for the materials of the cathode terminal 51 and the anode terminal 52, the same material or different materials may be used.

The cathode lead portion 51a and the anode lead portion 52a are integrally formed with the terminals 51 and 52 by manufacturing ends of the terminals 51 and 52 in a lead shape. It is preferable, but not necessary, to coat the cathode lead portion 51a and the anode lead portion 52a extracted from the exterior case 40 with a heat resistant and conductive heat shrinkable tube. This can be done to avoid any deleterious influence to a component (particularly the electronic device) by electric leakage resulting from a contact of the lead portions 51a and 52a to the heat source when a distance between the lead portions 51a and 52a and a heat source is small.

The first embodiment illustrates a case when the ends of the terminals 51 and 52 are formed as a lead shape. However, in the bipolar battery disclosed herein, it is not necessary that the terminals 51 and 52 themselves are elongated from the exterior case 40 to an outer side. The bipolar battery, for example, may comprise a rectangular terminal plane-contacted to the end collector 21e so as to be housed within the exterior case 40 and a lead installed in the terminal via a welding operation so as to be elongated from the exterior case 40 to the outer side. A conventional lithium ion battery lead may be used for such a lead.

To mitigate the impact from the outside when using the bipolar battery 10 and to prevent any environmental deterioration, the battery element 30 or the terminals 51 and 52 is housed within the exterior case 40. The exterior case 40 is formed of a flexible sheet material that seals the battery element 30, the cathode terminal 51 and the anode terminal 52. In certain embodiments, the inner pressure of the exterior case 40 is lower than an atmospheric pressure "Pa." Since the terminals 51 and 52 are merely loaded in the end collector 21e, any mechanical engagement therebetween is not practiced. The conductivity of the terminals 51 and 52 and the end collector 21e is secured by a metallic contact via a pressure applied when sealed by the exterior case 40. Optionally, an adhesive or non-adhesive agent with superior conductivity may be interposed between the terminals 51 and 52 and the end collector 21e. As the metallic contact therebetween becomes denser, the conductivity is further secured.

The sheet material may include a flexible material easily deformed without being destructed by a pressure difference between inside and outside of the exterior case 40. The battery element 30 is pressed from an up-down direction in the drawings via the terminals 51 and 52 by hydrostatic pressure using the atmospheric pressure Pa.

If the bonding of the terminals 51 and 52 and the end collector 21e is not electrically even throughout the entire surface, then a current density change may occur and deterioration may be facilitated as a result. In this embodiment, the pressure inside the exterior case 40 is less than the pressure Pa. outside the exterior case 40 when the hydrostatic pressure is the atmospheric pressure Pa. Therefore, the bonding of the terminals 51 and 52 and the end collector 21e is electrically consistent throughout the entire surface. Consequently, the current density is equally distributed, and the deterioration resulting from a current density change is reduced. The lower resistance of the terminals 51 and 52 becomes secured.

The sheet material preferably has electric conductivity without transmitting an electrolytic solution or gas and is chemically stable with the materials used, such as the electrolytic solution. For example, the sheet material may include a synthetic resin such as polyethylene, polypropylene, polycarbonate, etc.

A laminate film 41 including a metallic foil and a synthetic resin membrane may be applied to the sheet material to reduce thermal sealability of the exterior case 40, reduce air contact with the electrolyte and to reduce the weight. The laminate film 41 has a three-layer structure wherein a metallic foil 42 formed of metals such as aluminum, stainless, nickel and copper (including alloys thereof) is coated by conductive synthetic resin membranes 43 and 44 such as a polypropylene film. In addition to the polymer-metallic composite laminate film 41, an aluminum laminate pack may be used.

The polymer-metallic composite laminate film 41 or the aluminum laminate pack has superior heat conductivity. This is because, when mounted on a vehicle, the heat can be efficiently transferred from the heat source of the vehicle to the bipolar battery 10, rapidly heating the battery element 30 to a battery operating temperature.

When using the laminate film 41 in the exterior case 40, the exterior case 40 is formed by housing and sealing the battery element 30 or the terminals 51 and 52 by bonding a part or entire outer periphery of the laminate film 41 via thermal fusion. The lead portions 51a and 52a are inserted in the thermal fusion portion and exposed to an outer portion of the laminate film 41. In the present embodiment, when the laminate film 41 is applied to the exterior case 40, the layer of the metallic foil 42 reduces the gas permeability and maintains for longer periods the pressure difference between the inside and the outside. Thus, the stable electric contact between the terminals 51 and 52 and the end collector 21e can also be maintained for longer periods.

This description exemplifies a case wherein the terminals 51 and 52 are bonded to the end collector 21e by the hydrostatic pressure using the atmospheric pressure Pa. However, as long as the pressure inside the exterior case 40 is less than the pressure Pa outside the exterior case 40, the medium for generating the hydrostatic pressure is not limited. For example, the terminals 51 and 52 may be bonded to the end collector 21e by the hydrostatic pressure using a medium selected from any one of gas, liquid or solid powder or a combination thereof.

Stainless steel (SUS) is used for the collector 21 of the present embodiment. The stainless steel is stable against both the cathode active material and the anode active material. Therefore, the active material layers 22 and 24 can be formed at both surfaces of a single stainless layer.

In the terminal electrodes 33 and 34, the cathode active material layer 22 or the anode active material layer 24 is formed on one surface of the end collector 21e. A thickness of the end collector ranges from 1 μm to 100 μm, although it is certainly not limited thereto.

The cathode 23 includes a cathode active material. In addition, it may include a conductive auxiliary agent, binder, etc. These are sufficiently impregnated into the cathode 23 and the anode 25 as a gel electrolyte via chemical cross-linking or physical cross-linking operation.

A composite oxide of lithium and transition metal, which is also used in a lithium ion battery in a solution class, may be used for the cathode active material. Specifically, the oxide may include a Li—Co-based composite oxide such as $LiCoO_2$, a Li—Ni-based composite oxide such as $LiNiO_2$ and a Li—Fe-based composite oxide such as $LiFeO_2$. Further, it may also include a phosphate compound of a transition metal and lithium such as $LiFePO_4$ or a sulfated compound of a transition metal and lithium, a transition metal oxide or sulfide such as $V_2O_5$, $MnO_2$, $TiS_2$, $MoS_2$, $MoO_3$, etc., or $PbO_2$, AgO, NiOOH, etc.

In the manufacturing process, a particle size of the cathode active material can form a membrane via a spray coat by pasting a cathode material. Further, in order to restrain the electrode resistance of the bipolar battery 10, the particle size thereof is smaller than the particle size used in a lithium ion battery wherein the electrolyte is not solid but is of solution type. An average particle size of the cathode active material is within a range from 0.1 μm to 1 μm in some embodiments.

The polymer gel electrolyte includes the electrolytic solution used in a conventional lithium ion battery within the solid polymer electrolyte with ion conductivity. Further, it may include a polymer gel electrolyte retaining such an electrolytic solution within a polymer framework without any lithium ion conductivity.

The electrolytic solution included in the polymer gel electrolyte (electrolytic salt and plasticizer) is the same as that used in a conventional lithium ion battery. For example, the electrolytic solution may include at least one type of lithium salt (the electrolytic salt) selected from inorganic acid anion salts such as $LiPF_6$, $LiBF_4$, $LiClO_4$, $LiAsF_6$, $LiTaF_6$, $LiAlCl_4$ or $Li_2B_{10}Cl_{10}$, or from organic acid anion salts such as $Li(CF_3SO_2)_2N$ or $Li(C_2F_5SO_2)_2N$, and use an organic solvent (plasticizer) from a ring-type carbonate class such as propylene carbonate, ethylene carbonate, etc., a chain-type carbonate class such as dimethyl carbonate, methylethyl carbonate, diethyl carbonate, etc., an ether class such as tetrahydrofuran, 2-methyl tetrahydrofuran, 1,4-deoxane, 1,2-dimethoxyethane, 1,2-dibtoxyethane, etc., a lactone class such as γ-butyrolactone, a nitrile class such as acetonitrile, an ester class such as methyl propionate, etc., an amide class such as dimethylformamide, etc., and a non-proton solvent mixing least one or two selected from methyl acetate, methyl formate, etc. However, the electrolytic solution is certainly not limited thereto.

The polymer with ion conductivity is, for example, polyethylene oxide (PEO), polypropylene oxide (PPO) or a copolymer thereof. The polymer without lithium ion conductivity used in the polymer gel electrolyte may include, for example, polyvinylidene fluoride (PVDF), polyvinyl chloride (PVC), polyacrylonitile (PAN) and polymethylmethacrylate PMMA), although it is certainly not limited thereto. Further, since PAN and PMMA belong to the polymer with little ion conductivity, they may serve as the polymer with ion conductivity. However, they are exemplified herein as the polymer without lithium ion conductivity used in the polymer gel electrolyte.

The lithium salt may, for example, comprise inorganic acid anion salts such as $LiPF_6$, $LiBF_4$, $LiClO_4$, $LiAsF_6$, $LiTaF_6$, $LiAlCl_4$ or $Li_2B_{10}Cl_{10}$, organic acid anion salts such as $Li(CF_3SO_2)_2N$ or $Li(C_2F_5SO_2)_2N$, or a mixture thereof. The lithium salt is not limited thereto.

Further, the conductive auxiliary agent includes, for example, acetylene black, carbon black or graphite, although other agents are possible.

In the first embodiment, a pre-gel solution is prepared by mixing the electrolytic solution, the lithium salt and the polymer. Further, the pre-gel solution is impregnated into the cathode 23 and the anode 25.

A blending amount of the cathode active material, the conductive auxiliary agent and the binder should be determined by considering the purpose of use (e.g., emphasis on power or energy) or ion conductivity. For example, when a blending amount of the electrolyte within the cathode 23, particularly the solid polymer electrolyte, is excessively small, the ion conductive resistance or ion diffusing resistance within the active material layer is high, deteriorating the battery performance. When the blending amount of the electrolyte within the cathode 23, particularly the solid polymer electrolyte, is excessively large, the energy density of the battery is deteriorated.

The thickness of the cathode 23 should also be determined by considering the purpose of use (e.g., emphasis on power or energy) or ion conductivity as discussed in relation to the blending amount. A thickness of the general cathode active material layer is within a range from 10 to 500 μm in this embodiment.

The anode 25 includes an anode active material and may include a conductive auxiliary agent, binder, etc. Except for the type of the anode active material, other features of the anode are substantially identical as discussed above with respect to the cathode 23. Therefore, explanations thereof are omitted herein.

In certain embodiments, the anode active material is metallic oxide, lithium-metallic composite oxide metal or carbon. In other embodiments, the anode active material is carbon, transition metallic oxide, lithium-transition metallic composite oxide, titanium oxide or lithium-titanium composite oxide. A single independent material or two or more materials may be used for the anode active material. In the present embodiment, a battery with superior capacity and power is manufactured with the cathode active material layer 22 being lithium-transition metallic composite oxide and the anode active material layer 24 being carbon or lithium-transition metallic composite oxide.

The electrolyte layer 31 is formed from a polymer with ion conductivity; although the electrolyte layer 31 material is not limited to such. As described in this embodiment the electrolyte is a polymer gel electrolyte. As explained previously, the polymer gel electrolyte is prepared via chemical cross-linking or physical cross-linking after impregnating the pre-gel solution into the separator as a base.

Such a polymer gel electrolyte is prepared by including the electrolytic solution used in a conventional lithium ion battery within an all-solid polymer electrolyte with ion conductivity such as polyethylene oxide (PEO). The polymer gel electrolyte may include a polymer gel electrolyte retaining such an electrolytic solution within a polymer framework without any lithium ion conductivity such as polyvinylidene fluoride (PVDF). The ratio of polymer to electrolytic solution in the polymer gel electrolyte corresponds to the all solid polymer electrolyte when the polymer is 100% and corresponds to the liquid electrolyte when the electrolytic solution is 100%. The polymer electrolyte includes both the polymer gel electrolyte and the all-solid polymer electrolyte.

In addition to the polymer electrolyte of the battery, the polymer gel electrolyte may be included within the cathode 23 and/or anode 25. However, depending on the polymer electrolyte constituting the battery and depending on the layer, the cathode 23 and the anode 25 may include different polymer electrolytes or the same polymer electrolyte.

The thickness of the electrolyte of the battery is not limited. However, to obtain the compact bipolar battery 10, it is desirable that the thickness of the electrolyte is set as thin as possible while maintaining its functionality. A thickness of a general solid polymer electrolyte layer 31 is within a range from 10 to 100 µm in this embodiment. As for the shape of the electrolyte, by using the manufacturing process, the shape may be formed to coat the upper surface of the electrode (cathode 23 or anode 25) as well as the side outer periphery thereof.

If the electrolyte solution contained in the electrolyte layer 31 is exuded, then each layer is electrically connected to each other, and the bipolar battery 10 cannot serve as a battery. Such a process is referred to as liquid junction. To prevent liquid junction of the electrolyte, when a liquid or semisolid gel material is used for the electrolyte layer 31, the collector 21 and the separator 31a must be sealed. As shown in FIGS. 1 and 2B, a sealing member 36 is installed between the collector 21 and the separator 31a so as to surround the periphery of the unit cell layer 32. The sealing member 36 is, for example, a double-face adhesive tape wherein an adhesive material is applied to both surfaces of a base. The base is formed from conductive resin such as polypropylene (PP), polyethylene (PE), polyamide-based synthetic fabric, etc. The adhesive material is formed from a material with solvent resistance such as synthetic rubber, butyl rubber, synthetic resin, acryl, etc. The liquid leakage from the unit cell layer 32 and short-circuit resulting from a contact of the collectors 21 with each other is prevented by the sealing member 36.

The electrolyte layer 31 may be a solid electrolyte, thereby preventing the liquid junction by preventing leakage Because use of the solid electrolyte does not require the sealing material, manufacture of the bipolar battery is simpler.

The solid electrolyte may include a conventional solid polymer electrolyte such as PEO (polyethylene oxide), PPO (polypropylene oxide) or copolymer thereof. The solid polymer electrolyte layer includes a support salt (lithium salt) for securing the ion conductivity. The support salt may include $LiBF_4$, $LiPF_6$, $LiN(SO_2CF_3)_2$, $LiN(SO_2C_2F_5)_2$, or a combination thereof. However, it should be noted that the invention is certainly not limited to this configuration. The polyalkylene oxide-based copolymer such as PEO and PPO can fully melt the lithium salt such as $LiBF_4$, $LiPF_6$, $LiN(SO_2CF_3)_2$ and $LiN(SO_2C_2F_5)_2$. Superior mechanical strength can be obtained by forming the cross-liking structure.

FIGS. 4 to 9 describe a second embodiment of the invention. The members having the same function as in the first embodiment are denoted by the same reference numerals and duplicate explanations thereof are omitted herein. In the explanations below, to simplify the descriptions, the electrical resistance R3 along the surface direction of the cathode and anode terminals 51 and 52 is referred to as "surface direction electrical resistance R3" and the total electrical resistance R1+R2 of the battery element along the stacking direction is referred to as "stacking direction electrical resistance R1+R2."

A bipolar battery 12 of the second embodiment differs from that of the first embodiment since it further comprises a pressing unit 70 for pressing the battery element 30 along the stacking direction. The pressing unit 70 is configured to apply pressing forces with different strengths to a plurality of positions along the surface direction of the battery element 30.

Since the pressing forces with different strengths are applied to a plurality of positions, a contact state of each member constituting the unit cell layer 32, a contact state between each terminal end of the battery element 30 and each of the cathode and anode terminals 51 and 52, and a contact state between the individual elements 30a may be changed in each of the plurality of the positions. When the pressing force is strong, the battery resistance R1 or the contact resistance R2 can be reduced since the contact state becomes dense. In contrast, when the pressing force is weak, the battery resistance R1 or the contact resistance 12 is increased since the contact state becomes rough. Although the pressing force is changed, the surface direction electrical resistance R3 itself is not changed. Therefore, it becomes possible to vary the correlation between the surface direction electrical resistance R3 and the stacking direction electrical resistance R1+R2 in each of the plurality of the positions.

The pressing unit 70 can apply the pressing forces with different strengths in every subdivision dividing the positions along the surface direction of the battery element 30. Because the pressing forces with different strengths are applied to each subdivision having a certain area, changing the contact states between various members as above is simplified.

Each subdivision may be evenly divided in a rectangular shape. With the subdivisions evenly divided, the amount of contact state change with regard to the amount of pressing force change is even in every subdivision. Consequently, changing the correlation between the surface direction electrical resistance R3 and the stacking direction electrical resistance R1+R2 as desired is done precisely and easily.

In order to maintain a relationship wherein the surface direction electrical resistance R3 is smaller than the stacking direction electrical resistance R1+R2, the pressing unit 70 is configured to apply the pressing forces with different strengths in each of the plurality of positions. With this relationship maintained, the current density change in the battery element 30 is restrained, and the deterioration of the battery element 30 resulting from the current density change is reduced.

The stacking direction electrical resistance R1+R2 can be set smaller than the stacking direction electrical resistance R1+R2 in a pressing force (which becomes a standard pressing force) by setting the pressing force applied by the pressing unit 70 larger than the standard pressing force. In this regard, a ratio R3/(R1+R2) can be set larger. In contrast, the stacking direction electrical resistance R1+R2 can be set larger than the stacking direction electrical resistance R1+R2 in the standard pressing force by setting the pressing force applied by the pressing unit 70 smaller than the standard pressing force. In this regard, the ratio R3/(R1+R2) can be set smaller.

The surface direction electrical resistance R3 corresponding to a region in the battery element has low temperature dependence, while the battery resistance R1 or the contact resistance R2 does depend on temperature. When the atmospheric temperature of the bipolar battery 12 increases, the change in the surface direction electrical resistance R3 is small, and the battery resistance R1 or the contact resistance R2 decreases. Therefore, the ratio R3/(R1+R2) becomes larger.

To change the correlation between the surface direction electrical resistance R3 corresponding to a region in the battery element and the stacking direction electrical resistance R1+R2 according to the temperature, the pressing unit 70 comprises a detecting portion 71 for detecting a temperature in the battery element 30 and an operating portion 72 for generating the pressing force according to the detected temperature. When the detected temperature is higher than a standard operating temperature, the operating portion 72 generates a pressing force smaller than a pressing force at the standard operating temperature. When the detected temperature is lower than the standard operating temperature, the operating portion 72 generates a pressing force larger than the pressing force at the standard operating temperature. When the atmospheric temperature becomes higher than the operating temperature, the pressing force becomes smaller, and the ratio R3/(R1+R2) can be set smaller. To the contrary, when the atmospheric temperature becomes lower than the operating temperature, the pressing force becomes larger, and the ratio R3/(R1+R2) can be set larger.

The pressing force becoming larger when the detected temperature is lower than the standard operating temperature provides the following advantages. When the bipolar battery 12 is mounted on a device that generates a vibration at ignition, such as a vehicle including an internal combustion engine, the temperature of the battery element 30 is generally set lower than the standard operating temperature prior to ignition. At this time, a pressing force larger than the pressing force at the standard operating temperature is applied to the battery element 30. Although the vibration due to the ignition of the device is applied to the bipolar battery 12, the battery element 30 can sufficiently resist the vibration, reducing deterioration of the life of the battery element 30.

Referring to FIGS. 4 to 9, the bipolar battery 12 has an exterior case 73 for housing the battery element 30 while extending a part of the cathode and anode terminals 51 and 52. The detecting portion 71 and the operating portion 72 are formed by arranging a block body consisting of a shape memory alloy, which can shrink when a temperature of the battery element 30 becomes higher than the standard operating temperature, between at least one of the cathode and anode terminals 51 and 52 and the exterior case 73. The shrinking direction is set to follow along the stacking direction.

Since the battery resistance R1 tends to decrease when the temperature of the battery element 30 becomes equal to or more than 40° C., an alloy composition of the shape memory alloy is based on maintaining the standard operating temperature at equal or less than 40° C. The standard operating temperature is merely an example and is not limiting. Any desired temperature such as 50° C. can be selected. As for a material of the shape memory alloy, the conventional Ni—Ti class alloy (nitinol) may be used, and the block body 74 is formed by two-way repeating operation type element.

Figure 5:
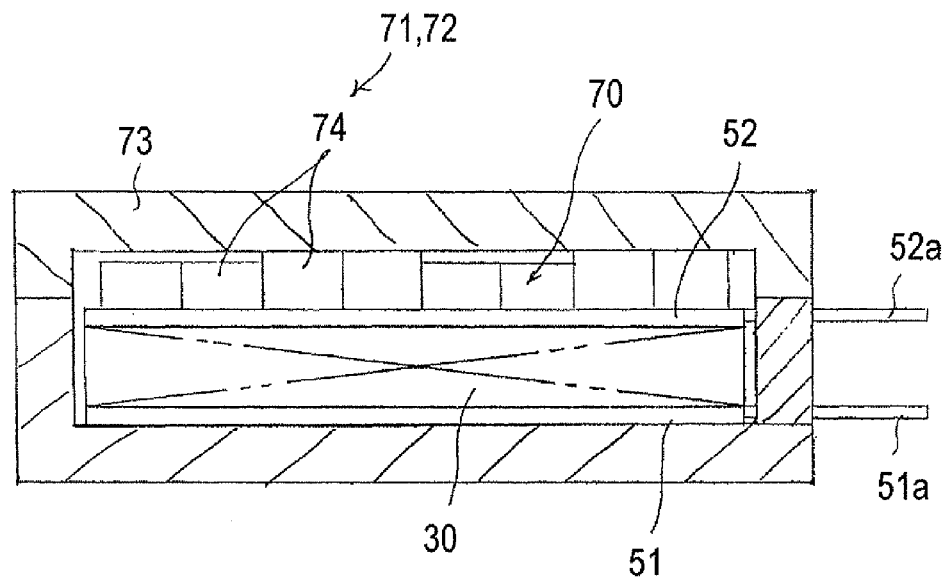
FIG. 5 is a cross-sectional view along the line 5-5 of FIG. 4.
Figure 6:
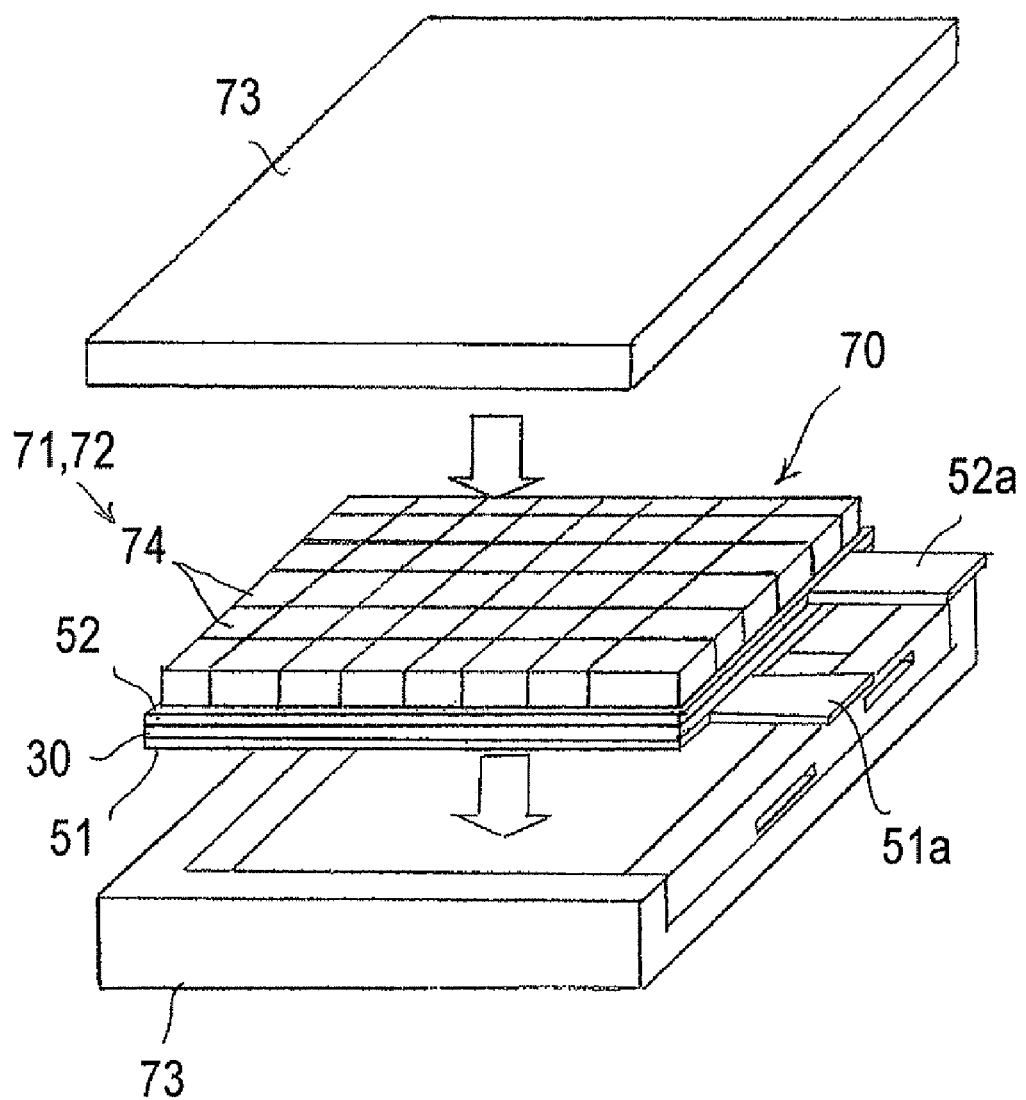
FIG. 6 is an exploded perspective view of the bipolar battery.
Figure 7:
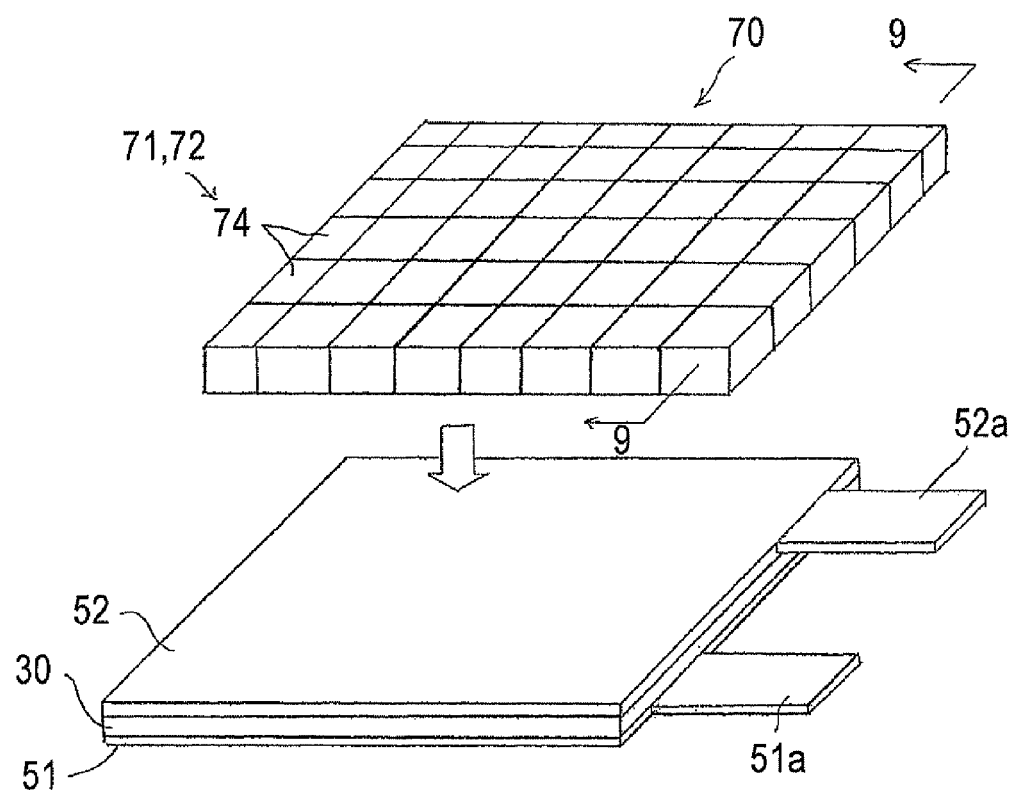
FIG. 7 is a perspective view illustrating a pressing unit arranged on an upper portion of an anode terminal.
Figure 8:
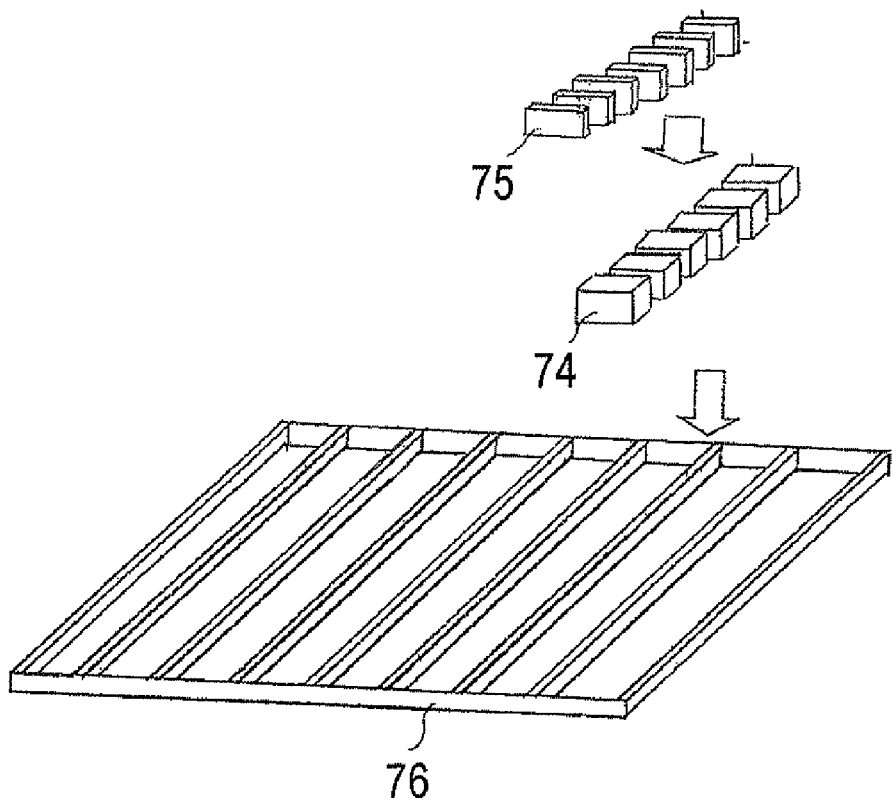
FIG. 8 is an exploded perspective view of the pressing unit.
Figure 9:
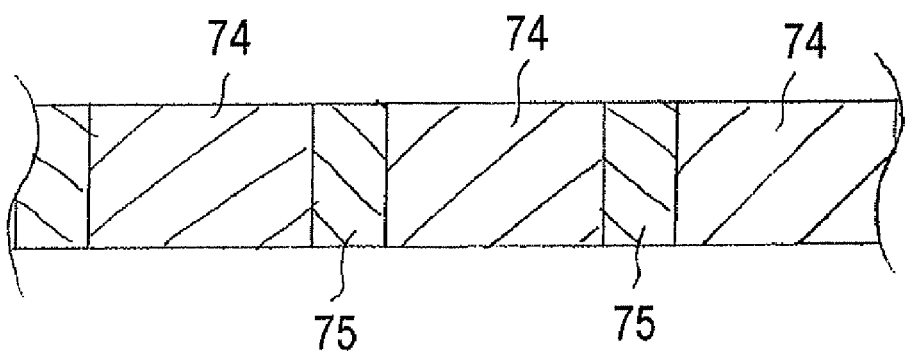
FIG. 9 is a cross-sectional view along the line 9-9 of FIG. 7.

The block body 74 is arranged in a number of 8×6 (see FIGS. 6 and 7). Every 48 subdivisions, the correlation between the surface electrical resistance R3 and the stacking direction electrical resistance R1+R2 can be changed. The number of the block body 74 and subdivisions is not limited, and a different, appropriate dividing number may be selected. Each block body 74 is set in a frame 76 while arranging partitioning walls 75 (see FIG. 8). FIG. 5 illustrates when a part of the block body 72 is shrunk. An up-down direction of FIG. 5 corresponds to a shrinking direction of the block body 74 and a stacking direction of the battery element 30.

In a section where the block body 74 is shrunk due to the temperature becoming higher than the standard operating temperature, the ratio R3/(R1+R2) is set to be larger in addition to the temperature rise. However, since the pressing force becomes smaller, setting the ratio R3/(R1+R2) to be smaller is generated at the same time. In this regard, the processes are balanced out with each other so that the ratio R3/(R1+R2) is constantly maintained. Therefore, although the temperature changes, the current density change of the battery element 30 is restrained, and deterioration of the battery element 30 resulting from the current density change is reduced.

In the second embodiment, the pressing forces with different strengths are applied to each of the positions by using the shape memory alloy. However, the invention is not limited to this configuration. For example, the pressing forces with different strengths may be applied to each of the plurality of the positions by using a resilient force of a spring or fluid pressure such as air pressure or hydraulic pressure. In case of the former, a structure is formed wherein a shrinking amount of the spring is varied in each of the plurality of the positions. In case of the latter, a valve member is installed for adjusting a pressure of the fluids supplied to each of the positions.

Figure 10:
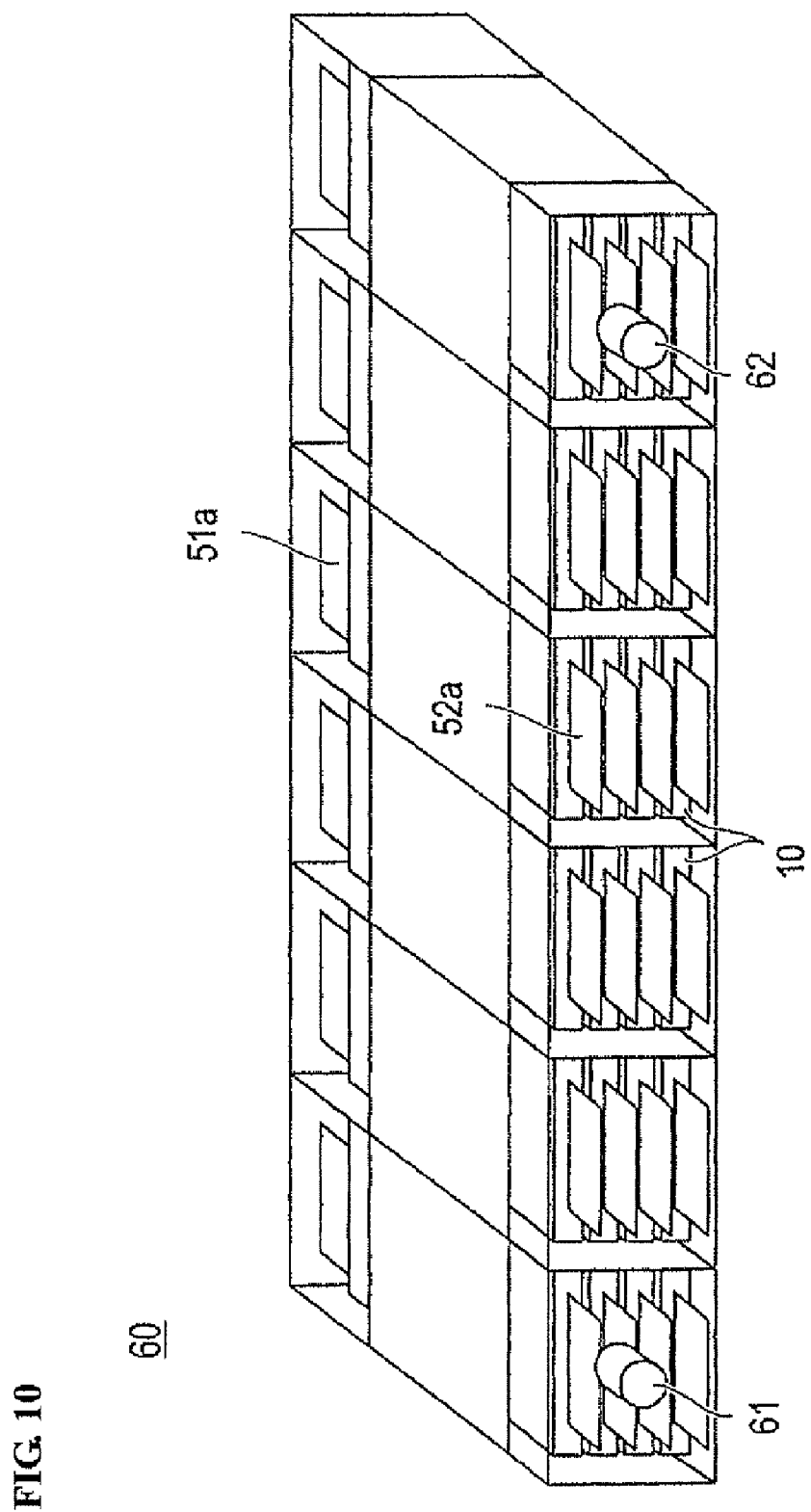
FIG. 10 is a perspective view of a battery assembly in accordance with a third embodiment of the invention.

FIG. 10 is a perspective view of a battery assembly 60 in accordance with a third embodiment of the invention. The battery assembly 60 is formed by electrically connecting a plurality of the bipolar batteries in parallel and/or in series. It becomes possible to freely adjust the capacity and power via serialization or parallelization.

The battery assembly 60 shown in FIG. 10 is formed by multi-connecting the bipolar batteries 10 of the first embodiment in series and then connecting them in parallel. As for an electrode of the battery assembly 60, electrode terminals 61 and 62 are installed at one side surface of the battery assembly 60. In the battery assembly 60, the connecting method includes, for example, an ultrasonic welding operation, a thermal welding operation, a laser welding operation, a rivet operation, a caulking operation or an electronic beam. A battery assembly 60 with long-term reliability can be manufactured by adopting such a connecting method.

According to the third embodiment, a battery with high capacity and high power can be obtained via battery assembling by connecting the bipolar batteries 10 in series or in parallel. Moreover, since each bipolar battery 10 restrains the deterioration of the battery element resulting from current density change, the long-term reliability of the battery assembly 60 is greatly improved.

Figure 11:
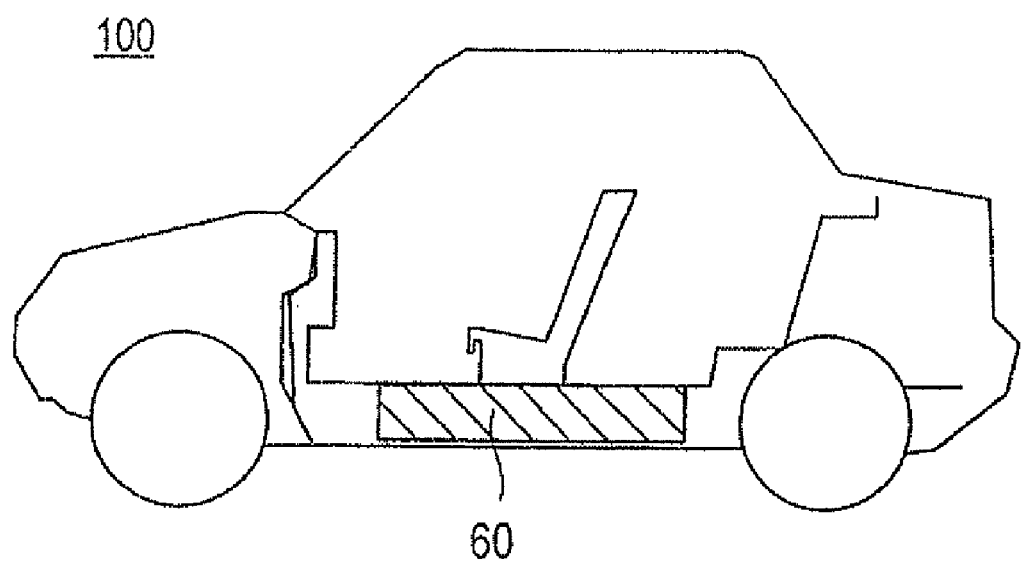
FIG. 11 is a diagram of an automobile constructed with an embodiment of the invention.

FIG. 11 is a diagram of a vehicle 100 in accordance with a fourth embodiment of the invention. It is preferred that the bipolar batteries 10 and 12 or the battery assembly 60 are mounted on a vehicle as a power source for a motor. The bipolar batteries 10 and 12 or the battery assembly 60 with the above noted characteristics will in turn increase the reliability and lifetime of a vehicle in which it is mounted. An automobile 100 shown in FIG. 11 uses the battery assembly 60 as the power source for the motor. The automobile using the battery assembly 60 as the power source for the motor includes, for example, an electric vehicle, a hybrid electric vehicle and a vehicle configured to drive each wheel by using the motor. The vehicle is not limited to the automobile 100 since the same effects can be obtained by mounting the bipolar batteries 10 and 12 or the battery assembly 60 on an electric train, for example.

An example of the bipolar battery is explained below. The manufactured bipolar battery includes two types, i.e., a conventional type battery element and a high power type battery element.

1. Preparation of the Conventional Type Battery Element

To prepare the cathode 23, a cathode slurry is prepared by adding $LiMn_2O_4$ as the cathode active material (85 wt % and 15 μm of average particle size), acetylene black (5 wt %) as the conductive auxiliary agent, polyvinylidene fluoride (PVDF, 10 wt %) as the binder and NMP (N-methyl-2-pyrolidone, appropriate amount) as a slurry viscosity adjusting solvent. These are mixed, and the cathode is formed by applying the cathode slurry to one side surface of the collector composed of stainless steel foil (thickness of 5 μm) and then drying it.

An anode 25 is prepared by adding hard carbon as the anode active material (90 wt % and 20 μm of average particle size), PVDF (10 wt %) as the binder and NMP (appropriate amount) as the slurry viscosity adjusting solvent. These are mixed, and the anode is formed by applying the anode slurry to the opposite surface of the stainless steel foil wherein the cathode is applied and then drying it.

The electrode is pressed via a heat roll press into the bipolar electrode. In the electrode after the pressing, the cathode is 50 μm and the anode is 50 μm. Thereafter, the electrode is prepared by cutting off as 320 mm×220 mm wherein an electrode is not applied in advance in 10 mm of a periphery of the electrode. By doing so, the bipolar electrode is prepared to have the electrode portion of 300 mm×200 mm and a sealing region of 10 mm in the periphery.

The polymer electrolyte layer is obtained by immersing a pre-gel solution consisting of 5 wt % of monomer solution having 7000 to 9000 of average molecular mass (copolymer of polyethylene oxide and polypropylene oxide), which is a precursor of ion conductive polymer matrix, 95 wt % of EC+PC (1:1) as the electrolytic solution, 1.0M of $LiBF_4$ and polymeric initiator (BDK) into 50 μm of non-woven fabric in polypropylene to be inserted into a quartz glass substrate. Then, cross-liking the precursor occurs by irradiating an ultraviolet ray thereto for 15 minutes. A size of the gel electrolyte layer is 310 mm×210 mm.

Next, stacking is described. A sealing material is prepared by loading an electrolyte retaining non-woven fabric on the cathode of the bipolar electrode and providing a hot melt having a three-layer structure in the sealing region in a periphery of the electrolyte retaining non-woven fabric. Each layer is sealed by stacking a predetermined number of the sealing materials (see Table 1 below) and fusing a sealing portion by applying heat and pressure from up and down directions.

2. Preparation of the High Power Type Battery Element

A cathode slurry is prepared by adding $LiNiO_2$ as the cathode active material (85 wt % and 6 μm of average particle size), acetylene black (5 wt %) as the conductive auxiliary agent, polyvinylidene fluoride (PVDF, 10 wt %) as the binder and N-methyl-2-pyrolidone (NMP, appropriate amount) as the slurry viscosity adjusting solvent, and then mixing them.

The cathode 23 is formed by applying the cathode slurry to one side surface of the collector composed of stainless steel foil (thickness of 5 μm) and then drying it.

An anode slurry is prepared by adding hard carbon as the anode active material (90 wt % and 8 μm of average particle size), PVDF (10 wt %) as the binder and NMP (appropriate amount) as the slurry viscosity adjusting solvent and then mixing them. The anode 25 is formed by applying the anode slurry to the opposite surface of the stainless steel foil wherein the cathode is applied and then drying it.

The electrode is pressed via the heat roll press into the bipolar electrode. In the electrode after the pressing, the cathode is 15 μm and the anode is 20 μm. Thereafter, the electrode is prepared by cutting off as 320 mm×220 mm wherein an electrode is not applied in advance in 10 mm of periphery of the electrode. By doing so, the bipolar electrode is prepared to have the electrode portion of 300 mm×200 mm and a sealing region of 10 mm in the periphery.

The polymer electrolyte layer is obtained by immersing a pre-gel solution consisting of 5 wt % of monomer solution having 7000 to 9000 of average molecular mass (copolymer of polyethylene oxide and polypropylene oxide), which is a precursor of ion conductive polymer matrix, 95 wt % of EC+PC (1:1) as the electrolytic solution, 1.0M of $LiPF_6$ and polymeric initiator (BDK) into 50 μm of non-woven fabric in polypropylene to be inserted into a quartz glass substrate. Then, cross-liking the precursor by irradiating an ultraviolet ray thereto for 15 minutes occurs. A size of the gel electrolyte layer is 310 mm×210 mm.

A sealing material is prepared by loading an electrolyte retaining non-woven fabric on the cathode of the bipolar electrode and providing a hot melt having a three-layer structure in the sealing region in a periphery of the electrolyte retaining non-woven fabric. Each layer is sealed by stacking a predetermined number of the sealing materials (see Table 1 below) and fusing a sealing portion by applying heat and pressure from up and down directions.

In either the conventional type or the high power type, the bipolar battery is completed by stacking a predetermined number of the battery elements (see Table 1), inserting the cathode and anode terminals for extracting predetermined current and vacuum-sealing the terminals in aluminum laminate.

As for a resistance value in every single layer of each battery element, the conventional type is 0.0328Ω and the high power type is 0.100Ω. The high power type battery element is used in the sixth embodiment and the first and second comparison examples.

TABLE 1

| | Stacking number of a unit cell layer | Resistance value of a unit cell layer (Ω) | r1 | N: Stacking number of a stack | R1 (r1 * N) | r2b | r2a | R2 | R3 | R3/(R1 + R2) |
|---|---|---|---|---|---|---|---|---|---|---|
| First Embodiment | 5 | 0.0328 | 0.164 | 1 | 0.164 | | 0.002 | 0.004 | 0.096 | 0.571 |
| Second Embodiment | 5 | 0.0328 | 0.164 | 1 | 0.164 | | 0.002 | 0.004 | 0.0096 | 0.0571 |
| Third Embodiment | 5 | 0.0328 | 0.164 | 1 | 0.164 | | 0.002 | 0.004 | 0.019 | 0.113 |
| Fourth Embodiment | 5 | 0.0328 | 0.164 | 1 | 0.164 | | 0.002 | 0.004 | 0.0019 | 0.0113 |
| Fifth Embodiment | 5 | 0.0328 | 0.164 | 1 | 0.164 | | 0.002 | 0.004 | 0.00345 | 0.0205 |
| Sixth Embodiment | 5 | 0.01 | 0.03 | 1 | 0.03 | | 0.002 | 0.004 | 0.019 | 0.559 |
| Seventh Embodiment | 5 | 0.0328 | 0.164 | 1 | 0.164 | | 0.002 | 0.004 | 0.000345 | 0.00205 |
| Eighth Embodiment | 5 | 0.0328 | 0.164 | 1 | 0.164 | | 0.002 | 0.004 | 0.000966 | 0.00575 |
| Ninth Embodiment | 5 | 0.0328 | 0.164 | 1 | 0.164 | | 0.002 | 0.004 | 0.00069 | 0.00411 |
| Tenth Embodiment | 5 | 0.0328 | 0.164 | 1 | 0.164 | | 0.002 | 0.004 | 0.00138 | 0.00821 |
| Eleventh Embodiment | 5 | 0.0328 | 0.164 | 2 | 0.328 | 0.005 | 0.002 | 0.009 | 0.096 | 0.285 |
| Twelfth Embodiment | 5 | 0.0328 | 0.164 | 1 | 0.164 | | 0.002 | 0.004 | 0.0000690 | 0.000411 |
| Thirteenth Embodiment | 5 | 0.0328 | 0.164 | 3 | 0.492 | 0.005 | 0.002 | 0.014 | 0.096 | 0.190 |
| Fourteenth Embodiment | 10 | 0.0328 | 0.328 | 10 | 3.28 | 0.01 | 0.005 | 0.1 | 0.096 | 0.0284 |
| Fifteenth Embodiment | 10 | 0.0328 | 0.328 | 10 | 3.28 | 0.01 | 0.005 | 0.1 | 0.00069 | 0.000204 |

TABLE 1-continued

|  | Stacking number of a unit cell layer | Resistance value of a unit cell layer (Ω) | r1 | N: Stacking number of a stack | R1 (r1 * N) | r2b | r2a | R2 | R3 | R3/(R1 + R2) |
|---|---|---|---|---|---|---|---|---|---|---|
| First Comparison Example | 3 | 0.01 | 0.03 | 1 | 0.03 |  | 0.002 | 0.004 | 0.096 | 2.82 |
| Second Comparison Example | 5 | 0.01 | 0.05 | 1 | 0.05 |  | 0.002 | 0.004 | 0.096 | 1.78 |

Figure 12:
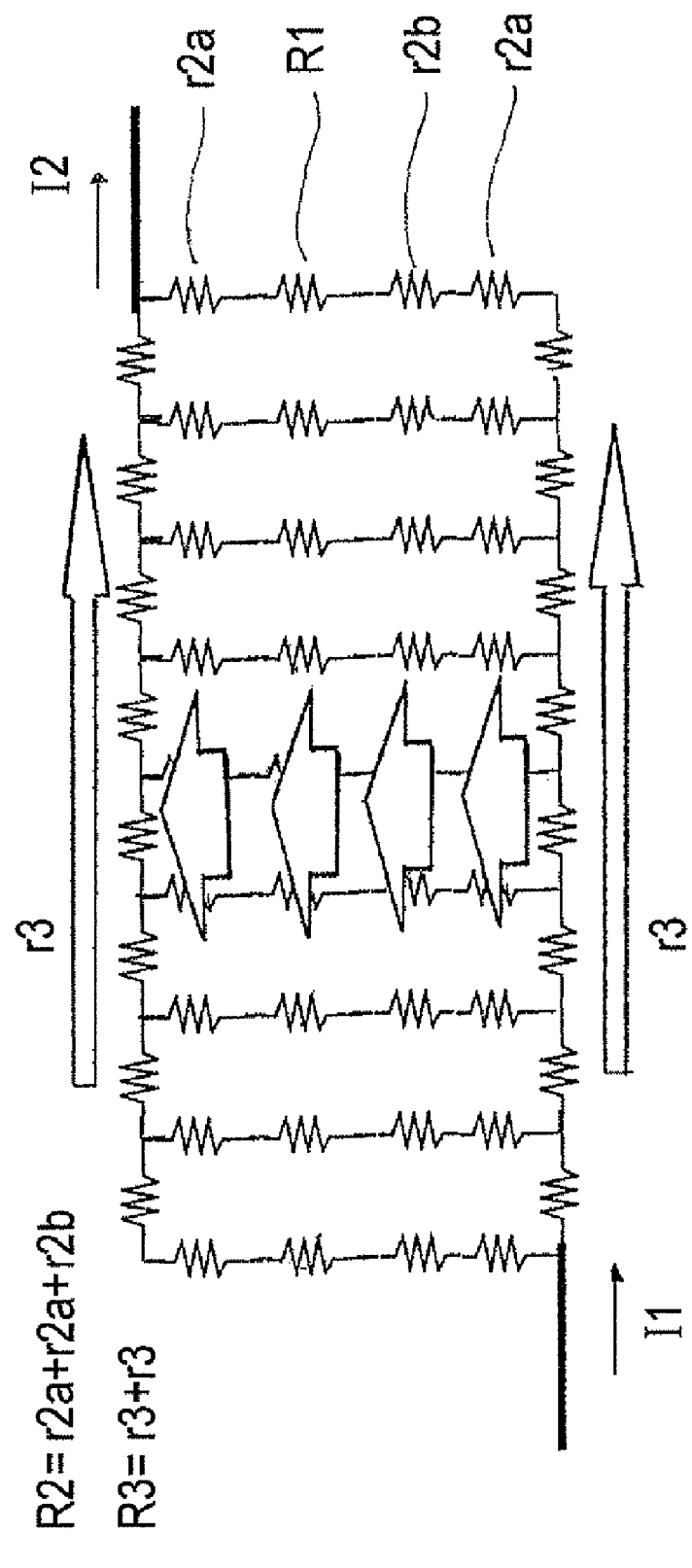
FIG. 12 is a circuit diagram used in a simulation for verifying the current density changes.

R1: Battery resistance of a battery element (= r1 × stacking number of a stack) (Ω)
R2: Contact resistance (= (N − 1) × r2b + 2 × r2a) (Ω)
R3: Surface direction electrical resistance of a current extracting terminal (Ω)
r1: Battery resistance of a stack (stacking number of a unit cell layer × resistance value thereof)
r2a: Contact resistance between a battery element and a current extracting terminal (Ω)
r2b: Contact resistance between battery elements FIG. 12 is a circuit diagram used in a simulation for verifying the current density changes. The simulation shown in FIG. 12 is indicated as a two-dimensional cross-sectional direction. In the drawings, the resistance R3 of the current extracting terminal is arranged in a horizontal direction, and the resistance R1 of the battery element and the contact resistance R3 are arranged in a vertical direction. The region is divided into eight regions and the applied current is set as 10A. The current value per unit region is 1.25 A (=10/8).

The current density change is defined as the result of the maximum current value of the current flowing in the vertical direction minus minimum current value, all divided by the current value in each unit area (for example, 1.25 A as above).

The current density change within the battery is simply calculated by applying the measured resistance values (R1, R2 and R3) to this simulation. The results are as shown in Table 2.

TABLE 2

Result of simulation

|  | Current change (%) | Current extracting terminal Material | Current extracting terminal Thickness |
|---|---|---|---|
| First Embodiment | 9.9 | SUS | 10 μm |
| Second Embodiment | 1 | SUS | 100 μm |
| Third Embodiment | 2 | SUS | 50 μm |
| Fourth Embodiment | 0.2 | SUS | 500 μm |
| Fifth Embodiment | 0.3 | AI | 10 μm |
| Sixth Embodiment | 9.8 | SUS | 50 μm |
| Seventh Embodiment | less than 0.01 | AI | 100 μm |
| Eighth Embodiment | less than 0.01 | SUS | 1 μm |
| Ninth Embodiment | less than 0.01 | AI | 50 μm |
| Tenth Embodiment | less than 0.01 | AI | 25 μm |
| Eleventh Embodiment | 5 | SUS | 10 μm |
| Twelfth Embodiment | less than 0.01 | AI | 500 μm |
| Thirteenth Embodiment | 3 | SUS | 10 μm |
| Fourteenth Embodiment | 0.5 | SUS | 10 μm |
| Fifteenth Embodiment | less than 0.01 | AI | 50 μm |
| First Comparison Example | 60 | SUS | 10 μm |
| Second Comparison Example | 58 | SUS | 10 μm |

For a long term evaluation of a high current charging/discharging operation, the following is performed. First, a constant current discharging operation is performed in a prototype battery at 100 mA, and a discharging capacity thereof is measured. Thereafter, a constant current (CC) charging operation is performed in the battery at 10A of the current. Then, a constant current (CC) discharging operation is performed at 20A. Such a process is defined as one cycle.

A charging/discharging test is repeatedly performed for a month (charging 10 seconds, 10 seconds, 100,000 cycles). Further, the charging/discharging test is repeatedly performed for three months (charging 10 seconds, 10 seconds, 300,000 cycles). Finally, the constant current discharging operation is performed in the battery at 100 mA, and a discharging capacity thereof is measured.

A result of the discharging capacity after a cycle when an initial discharging capacity is 100% is indicated in Table 3 below.

TABLE 3

Result of long-term reliability
(cycle of high current charging/discharging operation)

|  | After one-month cycle | After three-month cycle | R3/(R1 + R2) |
|---|---|---|---|
| First Embodiment | 73% | 46% | 0.571 |
| Second Embodiment | 83% | 53% | 0.0571 |
| Third Embodiment | 82% | 52% | 0.113 |
| Fourth Embodiment | 85% | 51% | 0.0113 |
| Fifth Embodiment | 84% | 52% | 0.0205 |
| Sixth Embodiment | 76% | 47% | 0.559 |
| Seventh Embodiment | 95% | 91% | 0.00205 |
| Eighth Embodiment | 95% | 92% | 0.00575 |
| Ninth Embodiment | 94% | 90% | 0.00411 |
| Tenth Embodiment | 93% | 89% | 0.00821 |
| Eleventh Embodiment | 80% | 50% | 0.285 |
| Twelfth Embodiment | 98% | 95% | 0.000411 |
| Thirteenth Embodiment | 81% | 50% | 0.19 |
| Fourteenth Embodiment | 84% | 52% | 0.0284 |
| Fifteenth Embodiment | 95% | 92% | 0.000204 |
| First Comparison Example | 42% | 11% | 2.82 |
| Second Comparison Example | 41% | 10% | 1.78 |

From the results of the simulation and the long-term evaluation of high current charging/discharging operation, it is understood that when the surface direction electrical resistance R3 corresponding to the battery element region of the current extracting terminal is larger than the stacking direction electrical resistance R1+R2 within the battery, the current density is significantly changed (60% and 58%). Consequently, the deterioration after the high current discharging operation is very significant (42% and 41%).

As to the above, as in the first to fifteenth embodiments, when the surface direction electrical current R3 corresponding to the battery element region of the current extracting terminal is smaller than the stacking direction electrical resistance R1+R2 within the battery, the results of the simulations in Table 2 show that it is possible to restrain the current density change to be equal to or less than 10%. Thus, it is possible to maintain a capacity maintenance rate after three-month high current charging/discharging operation to be equal to or greater than 46%. Such a three-month high current charging/discharging operation is a severe durability test. If the capacity maintenance rate can be maintained at 40% in such a test, then the lifetime of the battery is sufficient for general use. The results indicate that the surface direction electrical current R3 corresponding to the battery element region of the current extracting terminal is equal to or less than 0.57 against the stacking direction electrical resistance R1+R2 within the battery. Also, the current density change can be restrained to 9.9% and equal to or less than 10%.

Since the ratio is set as equal to or less than 0.01, the current density change becomes equal to or less than 0.1% (substantially "0" in the simulation). This sets the current density change as low as possible. As a result, the capacity maintenance rate in the high current charging/discharging operation for one month can be maintained at equal to or more than 90%. As for the three-month high current charging/discharging operation, the capacity maintenance rate can be maintained at equal to or more than 90% in all the embodiments. As seen in the table, the lowest capacity maintenance rate is 89% in the tenth embodiment. Although the capacity maintenance rate is set to be a low value as 85% after one-month cycle and 51% after three-month cycle when the ratio is 0.0113 in the fourth embodiment, a significant capacity maintenance rate change can be confirmed after at least such a value. Considering a measurement error, the ratio 0.01 is set as a critical value so that the capacity maintenance rate is abruptly increased.

Figure 1D:
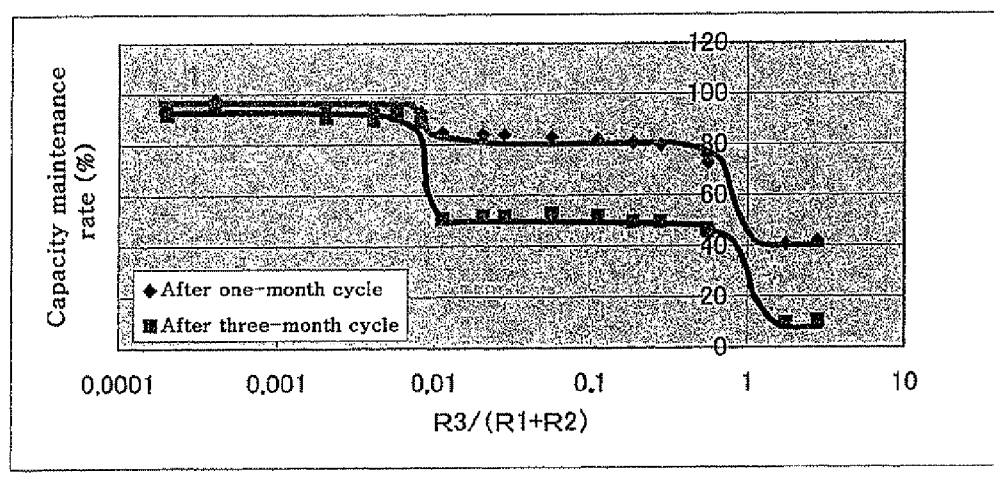
FIG. 1D is a graph showing the long-term reliability results tabulated in Table 3.

FIG. 1D illustrates the results after a one-month cycle and a three-month cycle of the long-term reliability shown in Table 3. The ratio R3/(R1+R2) is the transversal axis and the capacity maintenance rate (%) is the longitudinal axis. The graph shows the capacity maintenance rate is significantly increased when the ratio R3/(R1+R2) becomes lower than 1 so that battery quality is secured. Since the capacity maintenance rate is rapidly increased when the ratio is equal to or less than 0.01, the capacity maintenance rate reaches a value equal to or more than appropriately 90% of the maximum value. In this regard, such a rate is generated by the deterioration from repeating the charging/discharging cycle (not by the current change). As such, the rapid increase of the capacity maintenance rate is confirmed at a value wherein the ratio R3/(R1+R2) becomes lower than 1 and at a value wherein the ratio becomes equal to or less than 0.01. Therefore, it has been found that such values can be important in securing a quality performance of the bipolar battery.

The surface direction electrical current R3 corresponding to the battery element region of the current extracting terminal against the stacking direction electrical resistance R1+R2 within the battery being equal to or less than 1 is desirable. When the ratio is equal to or less than 0.01, the current density change within the battery is substantially reduced, and the deterioration of the battery element resulting from the current density change is also reduced. In this regard, it is possible to provide the bipolar battery having a superior high current charging/discharging operation.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A bipolar battery, comprising:
a battery element including at least one electrolyte layer and at least one bipolar electrode alternately stacked, each bipolar electrode comprising a cathode formed at a first side of a collector and an anode formed at an opposite side of the collector, wherein one of the at least one bipolar electrode has a cathode terminal electrode contacting a cathode terminal plate and one of the at least one bipolar electrode has an anode terminal electrode contacting an anode terminal plate, wherein the cathode and anode terminal plates are configured to produce a total electrical resistance in the cathode and anode terminal plates along a surface direction of the battery element that is less than the total electrical resistance of the battery element along the stacking direction between the cathode and anode terminal plates; and a pressing unit forming a single layer adjacent one of the cathode and anode terminal plates and configured to simultaneously apply a plurality of pressing forces with different strengths to a plurality of positions within the layer along the surface direction of the battery element, wherein a ratio of the total electrical resistance along the surface direction to the total electrical resistance of the battery element along the stacking direction is equal to or less than 0.01.

2. The bipolar battery according to claim 1 wherein when the pressing force applied by the pressing portion is greater than a standard pressing force, the total electrical resistance of the battery element along the stacking direction is less than the total electrical resistance of the battery element along the stacking direction under the standard pressing force, and when the pressing force applied by the pressing portion is less than the standard pressing force, the total electrical resistance of the battery element along the stacking direction is greater than the total electrical resistance of the battery element along the stacking direction under the standard pressing force.

3. The bipolar battery according to claim 1 wherein the pressing portion comprises:
a detecting portion operable to detect a temperature of the battery element; and
an operating portion operable to generate a pressing force according to the detected temperature, wherein when the detected temperature is higher than a standard operating temperature, the operating portion is operable to generate a pressing force less than a pressing force at the standard operating temperature, and when the detected temperature is less than the standard operating temperature, the operating portion is operable to generate a pressing force greater than the pressing force at the standard operating temperature.

4. The bipolar battery according to claim 1, further comprising:
an exterior case housing the battery element, a part of the cathode and anode terminal plates protruding through the exterior case to an outside; and wherein the detecting portion and the operating portion include a block body comprised of shape memory alloy arranged to contract in the stacking direction between at least one of the cathode and anode terminal plates and the exterior case when the temperature of the battery element becomes higher than the standard operating temperature.

5. The bipolar battery according to claim 1 wherein each of the cathode and anode terminal plates is an aluminum plate.

6. The bipolar battery according to claim 1 wherein the electrolyte layer comprises a solid electrolyte.

7. The bipolar battery according to claim 1, wherein the pressing portion comprises a plurality of subdivisions in the layer, each subdivision capable of applying a different force directly to by contact with the one of the cathode and anode terminal plates to which it is adjacent from its corresponding position within the layer along the surface direction of the battery element.

8. The bipolar battery according to claim 7 wherein each of the subdivisions is evenly divided in a rectangular shape.

9. The bipolar battery according to claim 7, wherein the pressing portion further comprises a frame in which the subdivisions are held, the subdivisions each separated by partitioning walls of the frame.

10. The bipolar battery according to claim 7, wherein the plurality of subdivisions operate independently to apply a required pressure to equalize current flow in the stacking direction between the cathode and anode terminal plates.

11. A bipolar battery, comprising:
a battery element including at least one electrolyte layer and at least one bipolar electrode alternately stacked, each bipolar electrode comprising a cathode formed at a first side of a collector and an anode formed at an opposite side of the collector, wherein one of the at least one bipolar electrode has a cathode terminal electrode contacting a cathode terminal plate and one of the at least one bipolar electrode has an anode terminal electrode contacting an anode terminal plate, wherein
the cathode and anode terminal plates are configured to produce a total electrical resistance in the cathode and anode terminal plates along a surface direction of the battery element that is less than the total electrical resistance of the battery element along the stacking direction between the cathode and anode terminal plates, and wherein a ratio of the total electrical resistance of the cathode and anode terminal plates along the surface direction to the total electrical resistance of the battery element along the stacking direction is equal to or less than 0.01.

12. The bipolar battery according to claim 11 wherein the total electrical resistance of the battery element along the stacking direction includes a battery resistance of the battery element and a contact resistance between the battery element and each of the cathode and anode terminal plates.

13. The bipolar battery according to claim 11, further comprising:
a plurality of stacked battery elements.

14. The bipolar battery according to claim 13 wherein the total electrical resistance of the battery element along the stacking direction includes a battery resistance of each battery element, a contact resistance between each battery element and each of the cathode and anode terminal plates, and a contact resistance between adjacent battery elements.

15. The bipolar battery according to claim 11, further comprising:
an exterior case housing the battery element, a part of the cathode and anode terminal plates protruding to an outside; wherein the exterior case comprises a flexible sheet material and an inner pressure of the exterior case is less than an atmospheric pressure.

16. The bipolar battery according to claim 15 wherein the sheet material is a laminate film comprising a metallic foil and a synthetic resin membrane.

17. The bipolar battery according to claim 11 wherein the cathode comprises a cathode active material including lithium-transition metallic composite oxide; and wherein the anode comprises an anode active material including carbon or lithium-transition metallic composite oxide.

18. The bipolar battery according to claim 11, wherein the bipolar battery is mounted in a vehicle as a power source for driving the vehicle.

19. A battery assembly formed by electrically connecting a plurality of the bipolar batteries of claim 11.

20. The battery assembly according to claim 19 wherein the assembly is mounted in a vehicle as a power source for driving the vehicle.

* * * * *